United States Patent [19]
DeBuisser et al.

[11] Patent Number: 5,717,168
[45] Date of Patent: Feb. 10, 1998

[54] METHOD AND DEVICE FOR CAPTURING AND PROCESSING GRAPHICAL INFORMATION

[75] Inventors: Thomas DeBuisser, Saint Jean d'Illac; Jean-Pierre Lerisson, Pessac; Laurent Gilliard, Bordeaux, all of France

[73] Assignee: Lectra Systemes, Cestas, France

[21] Appl. No.: 436,307

[22] PCT Filed: Nov. 17, 1993

[86] PCT No.: PCT/FR93/01123

§ 371 Date: Jun. 22, 1995

§ 102(e) Date: Jun. 22, 1995

[87] PCT Pub. No.: WO94/11844

PCT Pub. Date: May 26, 1994

[30] Foreign Application Priority Data

Nov. 17, 1992 [FR] France ................... 92 13786
Nov. 17, 1992 [FR] France ................... 92 13787

[51] Int. Cl.⁶ .............. G08C 21/00; G09G 3/02; G06K 9/00
[52] U.S. Cl. ............ 178/19; 178/18; 345/158; 345/176; 345/179; 382/187
[58] Field of Search .............. 178/18, 19; 345/158, 345/173, 176, 177, 179; 382/119, 120, 121, 122, 187

[56] References Cited

U.S. PATENT DOCUMENTS

| | | | |
|---|---|---|---|
| 4,317,005 | 2/1982 | de Bruyne | 178/19 |
| 4,654,648 | 3/1987 | Herrington et al. | 340/710 |
| 4,711,977 | 12/1987 | Miyamori | 178/18 |
| 4,814,552 | 3/1989 | Stefik et al. | 178/18 |
| 4,902,858 | 2/1990 | Yamanami | 178/19 |
| 5,126,513 | 6/1992 | Wang et al. | 178/19 |
| 5,134,388 | 7/1992 | Murakami | 178/19 |

FOREIGN PATENT DOCUMENTS

| | | |
|---|---|---|
| 0 307 667 | 3/1989 | European Pat. Off. |
| 0 307 893 | 3/1989 | European Pat. Off. |
| 0 497 598 | 8/1992 | European Pat. Off. |
| 2 423 000 | 11/1979 | France |
| 2 042 726 | 9/1980 | United Kingdom |
| 2 062 228 | 5/1981 | United Kingdom |

OTHER PUBLICATIONS

A. Appel and A.J. Stein, IBM Technical Disclosure Bulletin, vol. 24, No. 4, Sep. 1981, pp. 2013 and 2016.

*Primary Examiner*—Curtis Kuntz
*Assistant Examiner*—Vijay Shankar
*Attorney, Agent, or Firm*—Jones & Askew, LLP

[57] ABSTRACT

Ultrasound pulses are emitted by two emitters (12, 14) carried by an instrument (10) and substantially aligned with the tip of the instrument. Several receivers (62a, ..., 62e) occupy determined positions with respect to the support (50) on which a trace is made with the tip of the instrument so that ultrasound pulses emitted from any point on the surface of the support are received by more than two receivers. The times of propagation of the ultrasound pulses between each of the emitters and receivers are measured in order to evaluate the coordinates of the vector defined by the positions of the two emitters and to deduce therefrom the position of the tip of the instrument on the support, and at least one of the two instrument orientation cues consisting of the inclination of the longitudinal direction of the instrument with respect to the support and the angular position of the instrument about an axis making a predetermined angle with respect to the support. The pressure exerted on the support by the tip of the instrument is moreover detected in such a way as to determine a stroke width cue dependent on at least one of the orientation and pressure cues, on a stroke width cue, and to associate with a cue representing the position of the tip of the instrument, a cue representing the stroke width for this position.

27 Claims, 9 Drawing Sheets

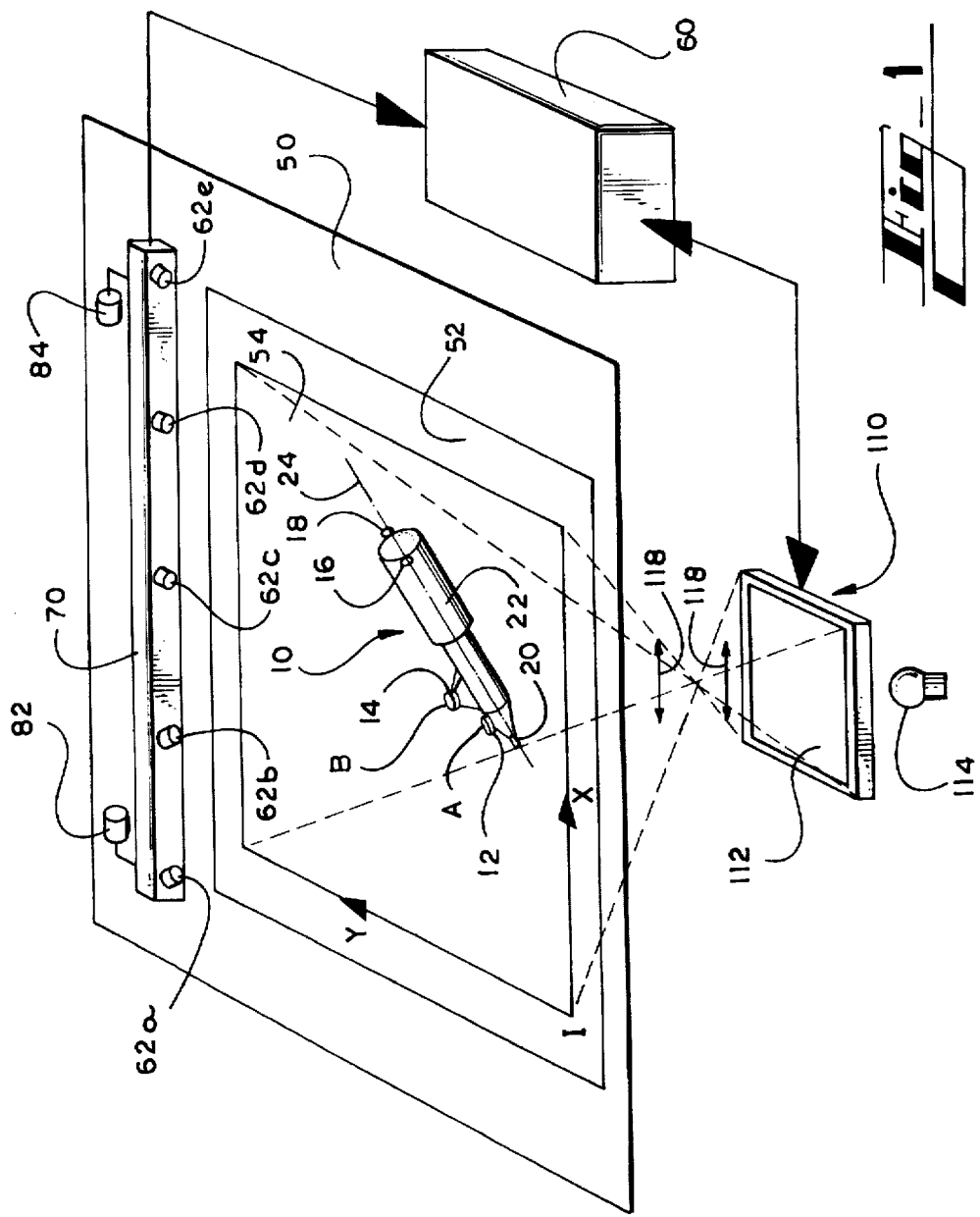

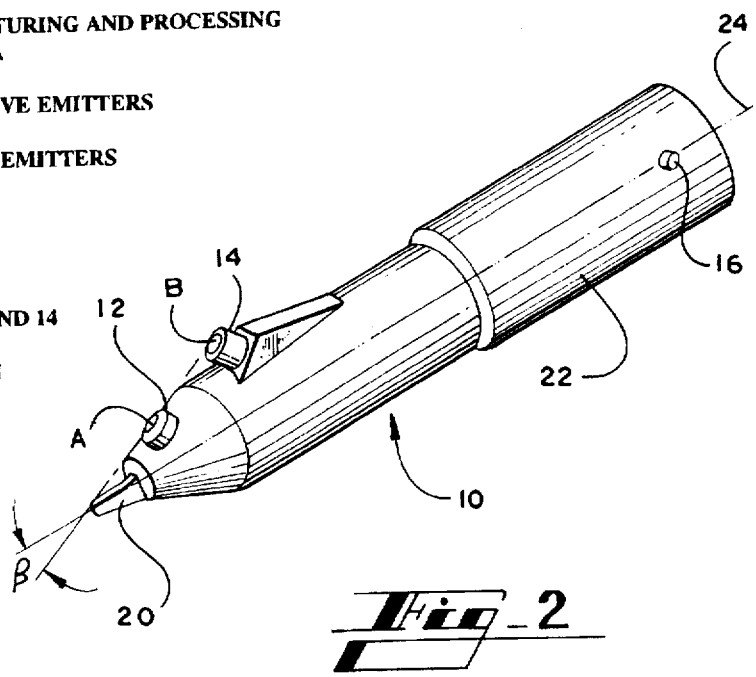

LEGEND

| | |
|---|---|
| 10 | DEVICE FOR CAPTURING AND PROCESSING GRAPHICAL DATA |
| 12, 14 | ULTRASOUND WAVE EMITTERS |
| 16 | INFRARED WAVE EMITTERS |
| 20 | DEVICE TIP |
| 22 | DEVICE BODY |
| A, B | CENTERS OF 12 AND 14 |
| β | ANGLE BETWEEN LINE A-B AND AXIS P |

Fig_2

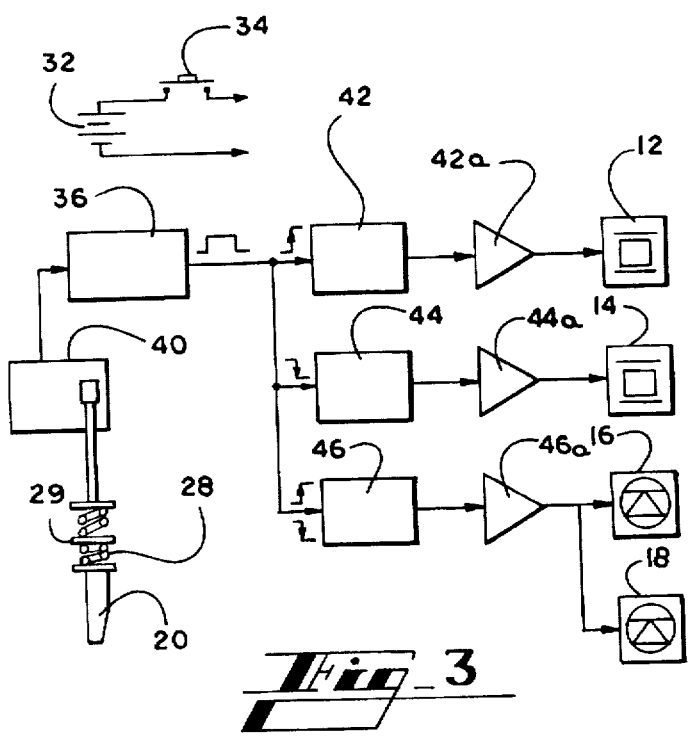

LEGEND

| | |
|---|---|
| 12, 14 | ULTRASOUND WAVE EMITTERS |
| 16, 18 | INFRARED WAVE EMITTERS |
| 20 | DEVICE TIP |
| 28 | SPRING |
| 29 | SPRING STOP |
| 32 | BATTERY |
| 34 | OFF-SWITCH CIRCUIT |
| 36 | TIME BASE |
| 40 | DISPLACEMENT SENSOR |
| 42, 44, 46 | MONOSTABLE CIRCUITS |
| 42A, 44A, 46A | AMPLIFIERS |

Fig_3

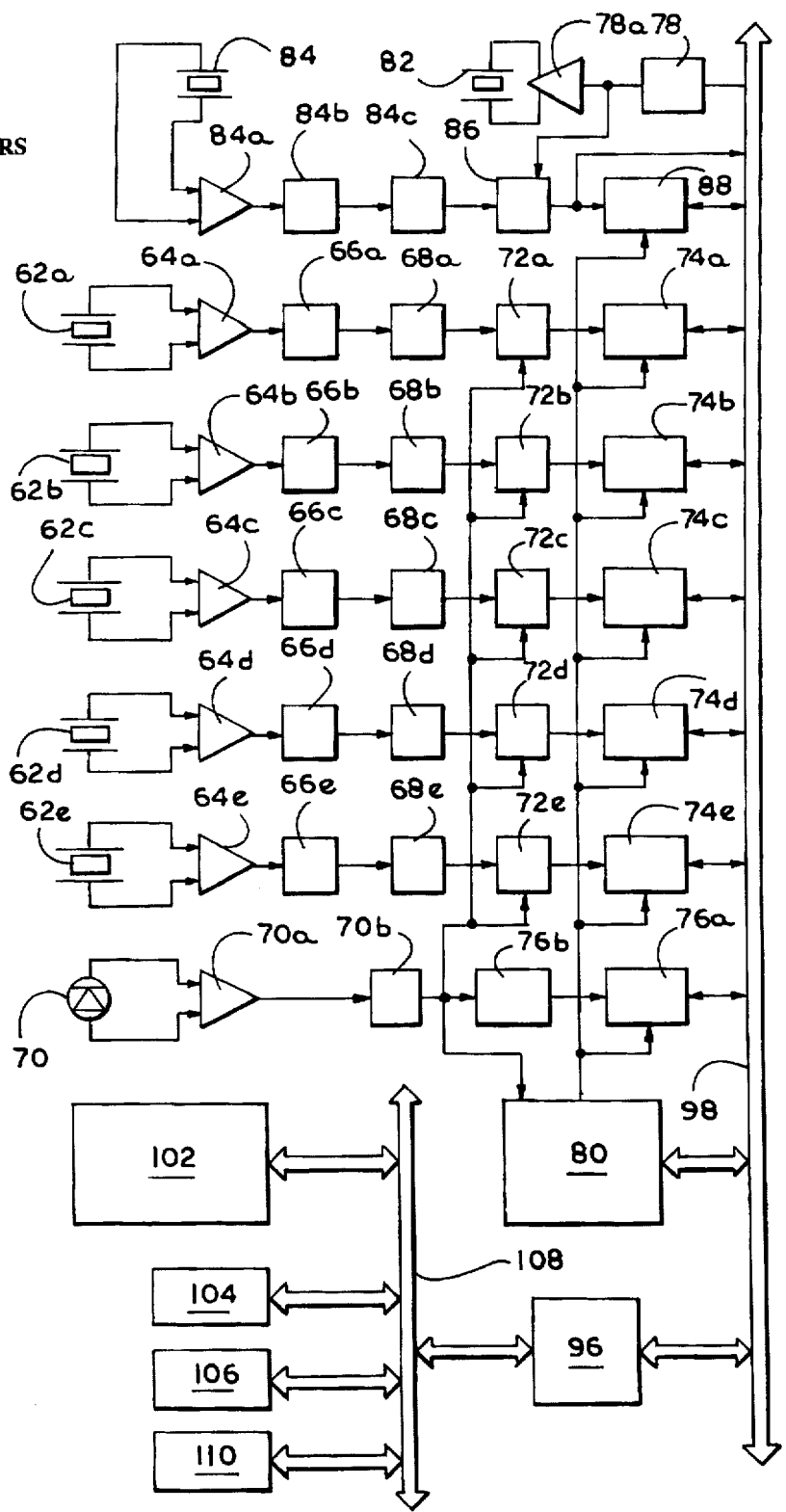

LEGEND

| | |
|---|---|
| 62A-E | ULTRASOUND WAVE RECEIVERS |
| 64A-E | AMPLIFIERS |
| 66A-E | THRESHOLD DETECTION CIRCUITS |
| 68A-E | MONOSTABLE CIRCUITS |
| 70 | DETECTOR |
| 70A | AMPLIFIER |
| 70B | MONOSTABLE CIRCUIT |
| 72A-E | BISTABLE LATCHES |
| 74A-E | COUNTERS |
| 76A | COUNTER |
| 76B | COUNTER MODULE |
| 78 | MONOSTABLE CIRCUIT |
| 78A | AMPLIFIER |
| 80 | PROCESSOR |
| 82 | EMITTER |
| 84 | RECEIVER |
| 84A | AMPLIFIER |
| 84B | THRESHOLD DETECTOR |
| 84C | MONOSTABLE CIRCUIT |
| 86 | BISTABLE LATCH |
| 88 | COUNTER |
| 96 | MEMORY |
| 98 | BUS |
| 102 | PROCESSOR |
| 104 | ROM MEMORY |
| 106 | RAM MEMORY |
| 108 | BUS |
| 110 | DISPLAY DEVICE |

Fig_6

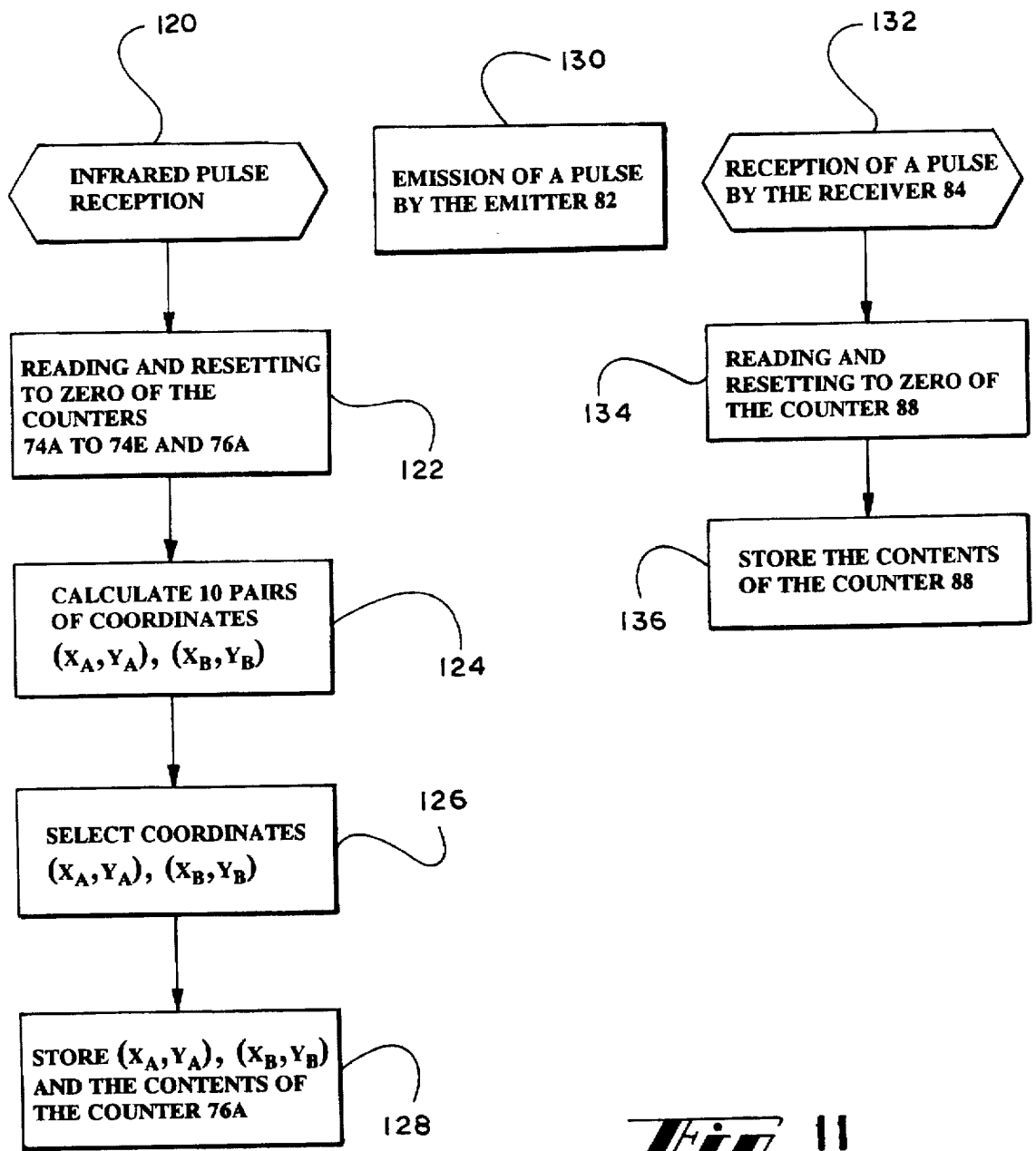
Fig_11

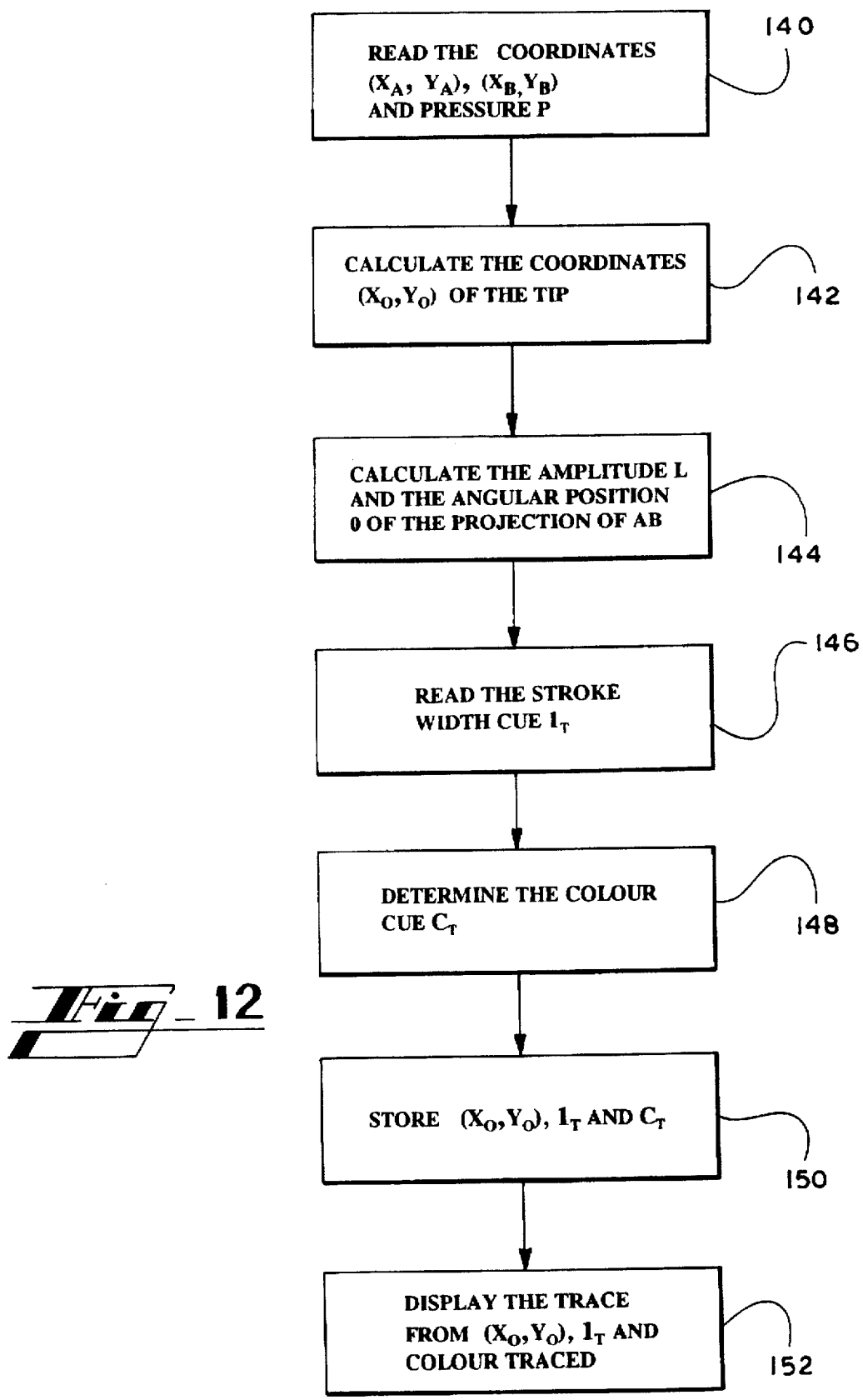
Fig_12

METHOD AND DEVICE FOR CAPTURING AND PROCESSING GRAPHICAL INFORMATION

FIELD OF THE INVENTION

The present invention relates to the capturing and processing of graphical information representative of a trace made on a support by means of a tip of an instrument.

A particular field of application of the invention is that of the applied graphic arts, so as to offer the possibility of digitizing a trace made manually by a designer, with a view to the instantaneous displaying of this drawing and/or its storage for subsequent exploitation by computer means.

BACKGROUND OF INVENTION

Various methods are known for digitizing a trace by registering successive positions of the instrument used to make this trace.

Some of these methods use special supports, or digitizing tablets, which allow the registering of the position of a tip of the instrument by propagating an electrical current or vibrations from the tip through the material of the support up to detectors arranged on the periphery of the support, or by electromagnetic coupling between the instrument and a network of conductors associated with the tablet. Such special supports are generally expensive and often offer only a working area of small dimensions. Additionally, these methods often suffer from low accuracy and low definition when reproducing the trace. This stands out all the more when tracing is done manually with a high tracing speed, this being the case with graphic art designers.

To avoid the use of special supports and to offer larger working areas, it has been proposed to register the position of the instrument by measuring the time of propagation of an ultrasound wave between an emitter carried by the instrument and several receivers occupying determined positions with respect to the support. Methods of this type, permitting the registering of position in a plane or in space, by using at least two or three receivers, are described in the documents FR-A-2,054,633 and FR-A-2,551,542.

The document FR-A-2,423,000 describes a device in which the instrument carries two ultrasound emitters aligned with the tip of the instrument so as to determine accurately the coordinates of this tip on a plane surface based on the registering of the positions of the two emitters.

It is necessary to synchronize the emission of an ultrasound wave by the emitter carried by the instrument and the start of the measurement of the propagation time by a measurement circuit connected to the receivers. Synchronization can be performed through a wire link with the instrument or, as described in particular in the document EP 0,312,481, by transmitting an infrared wave. In this latter case, the method offers the additional advantage of allowing execution of the trace by means of a wireless instrument, the latter then being provided with a self-contained power supply.

These methods using the transmission of ultrasound waves are suitable for the particular application envisaged, namely the digitizing of drawings made freehand. Moreover, by emitting ultrasound waves in pulse form, that is to say by emitting ultrasound pulses, higher accuracy and higher definition in the digitization of the trace can be achieved by choosing a sufficiently high frequency of the pulses.

However, these methods have a limitation in that they offer the sole possibility of digitizing a trace in the form of lines of dots. Now, in certain sectors of the applied graphic arts, designers, in particular stylists, habitually work with felt-tips or other writing implements, for example the pencil, making it possible to produce traces with a variable stroke width, in the colours of their choice.

A device allowing the simulation of such work, together with display by back-projection of the trace produced, is described in essence by the document FRA2,676,568 published after the priority date claimed for the present application.

SUMMARY OF THE INVENTION

The aim of the invention is to provide a method which allows fast and accurate capture of graphical information comprising a position cue for an instrument and a stroke width cue in a real or simulated fashion by means of an instrument.

In particular, the aim of the invention is to allow realistic reproduction of a work with felt-tips or other writing implements with which the stroke width varies depending on the way in which the implement is held or applied to the support.

The aim of the invention is also to allow accurate capture of the graphical information, even in the case of traces made rapidly freehand, and to permit the use of wireless instruments and neutral supports offering working areas whose dimensions may be relatively large.

These aims are achieved, according to the invention, by virtue of a method of capturing and processing graphical data representative of a trace made on a surface of a neutral support by means of a tip of an instrument, a method comprising:

- the emission of ultrasound pulses by means of at least two ultrasound wave emitters carried by the instrument and spaced apart in a longitudinal direction of the latter, and substantially aligned with the tip of the instrument,
- the reception of the ultrasound pulses by several ultrasound wave receivers occupying positions determined with respect to the support in such a way that ultrasound pulses emitted from any point on the surface are received by more than two receivers,
- measurement of the propagation times of the ultrasound pulses between each of the emitters and receivers,
- the evaluation, from the measured propagation times, of the coordinates of at least one vector defined by the positions of the two emitters carried by the instrument,
- the determination, from the evaluation of the coordinates of the said vector, of the position of the tip of the instrument, and of at least one of the two instrument orientation cues consisting of the inclination of the longitudinal direction of the instrument with respect to the support and the angular position of the instrument about an axis making a predetermined angle with respect to the support,
- the detection of the pressure exerted on the support by the tip of the instrument,
- the transmission of a cue representative of the detected pressure and
- the determination, as a function of at least one of the orientation and pressure cues, of a stroke width cue, so as to associate with a cue representing the position of the tip of the instrument, a cue representing the stroke width for this position.

For the evaluation of the coordinates of the vector defined by the positions of the two emitters, use is made of a redundant number of propagation time measurements, so that an erroneous or anomalous measurement can be detected and discarded.

The orientation cues of the instrument are determined from the measurement of the amplitude and direction of the projection onto the support of the vector defined by the positions of the two emitters.

The selection of the working parameters for determining the stroke width cue is carried out on the basis of the type of writing implement whose use is simulated by means of the instrument. Certain writing implements, for example flat-tipped felts, produce strokes whose width varies as a function of the position in which they are held. Other implements, for example ogive tipped felts, pastels, pencils, produce strokes whose width varies as a function of the pressure exerted on the tip. Finally, certain implements, for example pencils, produce strokes whose width may vary as a function of the position in which they are held and the pressure exerted.

Advantageously, the method comprises a step of selection of a type of writing implement simulated by the instrument and determination of the stroke width is performed on the basis of prerecorded cues giving, for various writing implements, a relation between the width of stroke and at least one of the said cues, inclination of the writing implement, angular position of the writing implement, and pressure exerted on the tip of the writing implement.

In a manner known per se, the emission of the ultrasound pulses by an emitter and the commencement of the measurement of the time of propagation of this pulse up to the receivers are synchronized by transmitting an infrared pulse, this so as to be able to employ a wireless instrument. The infrared pulses may be transmitted between an emitter carried by the instrument and a receiver attached to the support, or vice versa. The cue representative of the pressure exerted on the tip of the instrument is transmitted by modulation of the synchronizing infrared pulse trains.

The ultrasound waves emitted by the emitters carried by the instrument are in the form of pulse trains, for example time-shifted trains of pulses of like frequency. This frequency, which determines the frequency of sampling of the trace, is chosen to be sufficiently high, preferably at least equal to 50 aHz. Acquisition of the coordinates of at least 50 vectors per second makes it possible to retain high accuracy in capturing a trace, even when it is made with a high speed of hand.

Advantageously, in the case of the simulation of certain writing implements, the method comprises the selection of a stroke colour and the determination of a colour density cue on the basis of the cue representing the pressure exerted on the tip of the instrument, so as additionally to associate with the cue representing the position of tip of the instrument, a cue representing the colour of the trace for this position.

Different colours may be selected for various portions of the trace. The trace colour cue associated with the position cue for the tip of the instrument then consists:

either in the stroke colour selected for that portion of the trace on which the position of the tip of the instrument lies, or in a colour saturation selected when the position of the tip of the instrument is at the intersection of several trace portions for which the same colour has been selected, or in a mixture of colours selected when the position of the tip of the instrument is at the intersection of several trace portions for which different colours have been selected.

The displaying in real time of an image reproducing the position, stroke width and trace colour cues enables a user to view in a realistic way the trace which he is making on the support, such as he would have obtained for example with a felt-tip or a pencil. This displaying is performed preferably by back-projection onto the support, so that the image appears directly under the tip of the instrument while tracing.

Also advantageously, the method comprises the displaying of a menu in a zone of the surface of the support and the selecting of an option from the displayed menu, in response to the detection of the position of the tip of the instrument at a location corresponding to the said option. The displayed menu allows the selection in particular of a type of writing implement whose use is simulated, the gauge of this implement and the colour of trace.

Consequently, and with a wireless instrument, the method is noteworthy through its flexibility and ease of implementation. It allows very great freedom of movement while also retaining high accuracy in the capturing of the trace together with its colour, its thick strokes and hair-strokes, and while also allowing the displaying of this trace in real time. Furthermore, the method is useable with a neutral support, that is to say it necessitates no support required to exhibit special characteristics in respect of the capturing of position cues for the instrument relative to this support.

The aim of the invention is also to provide a device allowing the implementation of the method defined above.

This aim is achieved with a device for capturing and processing graphical data representative of a trace made on a surface of a support by means of a tip of an instrument, a device including:

at least two ultrasound wave emitters carried by the instrument and spaced apart in a longitudinal direction of the instrument and substantially aligned with the tip of the instrument, a voltage pulse generating circuit connected to the emitters in order to effect the emission of ultrasound pulse trains, several ultrasound wave receivers occupying positions determined with respect to the support in such a way that ultrasound pulses emitted from any point on the surface are received by more than two receivers, means for detecting the pressure exerted on the tip of the instrument, means of transmitting a pressure cue representative of the detected pressure, and a processing circuit connected to the ultrasound wave receivers and receiving the pressure cue, the processing circuit comprising means for:

measuring the propagation times of the ultrasound pulses between each of the emitters and receivers, evaluating, from the measured propagation times, the coordinates of at least one vector defined by the positions of the two emitters carried by the instrument determining, from the evaluation of the coordinates of the said vector, the position of the tip of the instrument on the support, and at least one of the two instrument orientation cues consisting of the inclination of the longitudinal direction of the instrument with respect to the support and the angular position of the instrument about an axis making a predetermined angle with respect to the support, and determining, as a function of at least one of the orientation and pressure cues, a stroke width cue, so as to associate with a cue representing the position of the tip of the instrument, a cue representing the stroke width for this position.

The invention will be better understood on reading the description given below, by way of indication, but without limitation, with reference to the appended drawings in which:

BRIEF DESCRIPTION OF THE DRAWINGS

FIG. 1 is a very schematic general view of an embodiment of a device in accordance with the invention;

FIG. 2 is a more detailed view of the emitter instrument forming part of the device of FIG. 1;

FIG. 3 is a diagram of the circuits of the emitter of FIG. 2;

FIG. 6 is a diagram of the reception and processing circuits forming part of the device of FIG. 1;

FIGS. 11 and 12 are flowcharts illustrating functions carried out by processors of the processing circuit forming part of the device of FIG. 1; and FIG. 13 is a schematic representation of the displaying of a trace with the device according to the invention.

DESCRIPTION OF THE DISCLOSED EMBODIMENT

Figure 4:
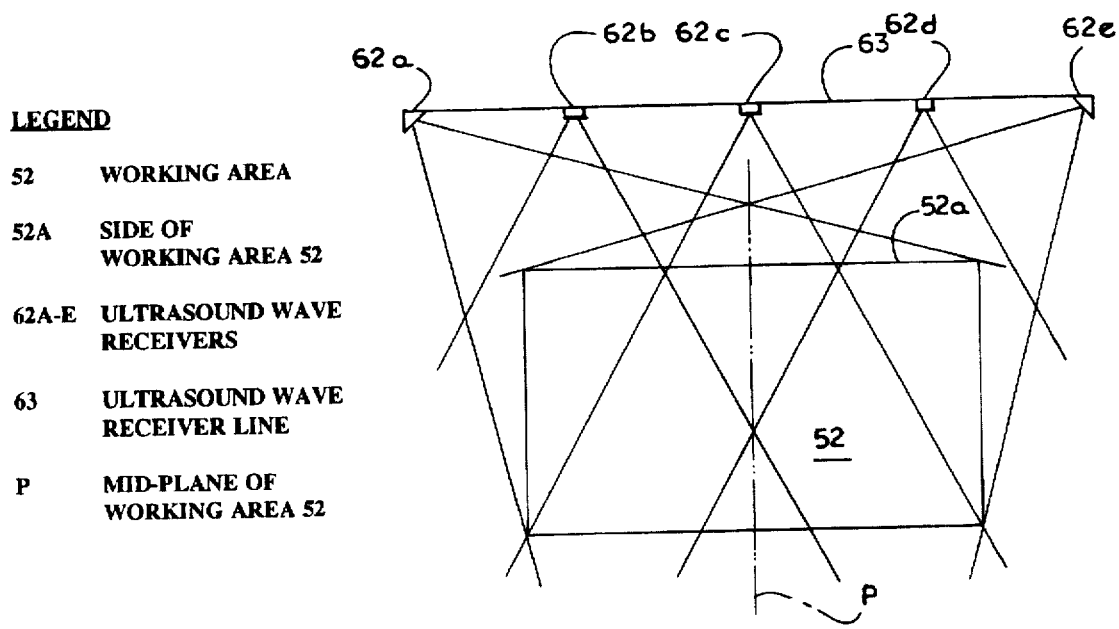
FIG. 4 illustrates the coverage of the working area for capturing position cues with the ultrasound wave receivers of the device of FIG. 1.

The device illustrated schematically by FIG. 1 is intended to allow the capture, display and storage of graphical information representative of a trace made manually by means of an instrument 10 by pressing the tip 20 of the latter on a plane surface of a support 50.

The instrument 10 (FIGS. 1 and 2) has the general form of a ballpoint pen with a substantially cylindrical body 22 carrying two ultrasound wave emitters 12, 14 and two infrared wave emitters 16, 18.

The ultrasound emitters 12, 14 are situated in the vicinity of the end of the instrument carrying the tip 20, on the same side of the body 22, and are spaced apart in the direction of the longitudinal axis 24 of the instrument. The emitter 14, which is furthest from the tip 20, is situated at a distance from the axis 24 which is greater than that separating the emitter 12 from the axis 24. Thus, the straight line passing through the centres a and b of the emitters 12, 14 is not parallel to the axis 24.

The infrared wave emitters 16, 18 are situated in the vicinity of the opposite end of the instrument from that carrying the tip 20, and are arranged opposite to one another with respect to the axis 24. In this way, it is virtually certain that at least one of the two emitters 16, 18 is not occulted when the instrument 10 is held in the hand.

The tip 20 can move parallel to the axis 24 and can be retracted under the effect of a pressure exerted against a restoring spring housed in the body 22.

The ultrasound waves emitted by the emitters 12, 14 are received by ultrasound wave receivers 62a, 62b, 62c, 62d, 62e fixed on the support 50.

The ultrasound wave emitters and receivers are for example constituted by piezoelectric transducers which are directional, that is to say which emit and receive inside a cone centred on the transducer. It will for example be possible to use components marketed by the Japanese company Murata under reference MAá40S2S (for the emitters) and MAá40S2R (for the receivers), or else under the reference MAá405AR. These components have, in emission, a range of up to several meters, this offering the possibility of having working areas of large dimensions.

Defined on the support 50 are a working area 52, inside which the coordinates of every point can be determined, and a viewing area 54, inside which a trace can be made and, as indicated further on, can be back-projected. The areas 52 and 54 are two rectangular areas with respectively parallel sides, the area 54 being included within the area 52.

The arrangement of the receivers is chosen so that every point of the working area 52 is "visible" to the requisite minimum number of receivers for determining the position of this point with redundancy.

As shown more particularly by FIG. 4, the receivers, five in number, are arranged on a line 63 parallel to a large side 52a of the working area 52, outside the latter and advantageously in a parallel plane close to the plane of the area 52. The receivers 62a and 62e situated at the ends of the line 63 are spaced apart by a distance greater than the length of the side 52a. So as to ensure optimal coverage of the area 52, the receivers, in particular those 62a and 62e situated at the ends, are oriented so that the axis of their cone of reception is directed substantially towards the centre of the area 52.

Of course, the number of receivers may differ from five. It will however be noted that the smaller the number, the further the receivers must be distanced from the area 52 in order to cover the totality thereof by the cones of reception, something which may have drawbacks as regards proportions and by reason of the greater fading of the waves received. This is why a number of receivers at least equal to five is preferable.

In order to afford the redundancy necessary to be able to detect and eliminate errors or anomalies when determining the position of the tip of the instrument 10 on the area 52, each point of the latter is situated inside at least three cones of reception, as is the case in FIG. 4.

Figure 5:
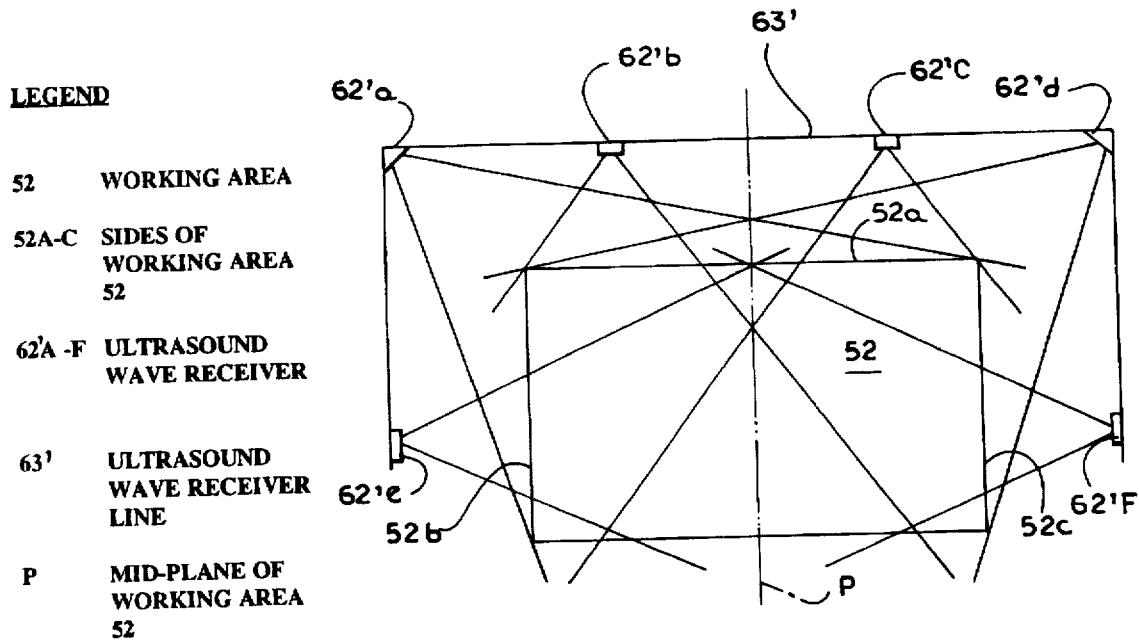
FIG. 5 illustrates an alternative arrangement of the ultrasound wave receivers in order to cover a working area similar to that of FIG. 2.

An alternative arrangement of the receivers is illustrated by FIG. 5. In this case, four receivers 62'a, 62'b, 62'c, 62'd are arranged on a line 63' parallel to the side 52a of the area 52 whilst two additional receivers 62'e, 62'f are situated straddling the sides 52b, 52c of the area 52 which are adjacent to the side 52a. As before, these receivers may advantageously be arranged in a parallel plane close to the area 52. A number of receivers different from six may be chosen, for example by arranging more or fewer than four receivers along the line 63'.

It will be noted that in the two arrangements of FIGS. 4 and 5, the receivers are arranged symmetrically with respect to the mid-plane P of the area 52 perpendicular to the side 52a. This makes it possible not to introduce asymmetry of reception depending on whether the instrument 10 is held by a right-handed or left-handed user.

The infrared waves emitted by the emitters 16, 18 are received by an infrared wave receiver 17 fixed on the support 50. The infrared wave emitters are constituted by electroluminescent diodes and the receiver by a photodiode.

A processing circuit 60 is connected to the receivers and comprises measurement and calculation means for compiling information representative, on the one hand, of the position of the tip 20 on the support 50 and, on the other hand, of the stroke width simulated by the way in which the instrument 10 is held with respect to the support and/or the pressure exerted on the tip 20 when executing a trace. This information is transmitted to a display device 110 for displaying in real time the image of the trace on a screen 112, and is also stored in a memory of the processing circuit. It can supplemented with a cue representing the colour of the trace for each position of the tip 20, which cue is obtained from a stroke colour selection made by the user.

The screen 112 is for example constituted by a monochrome or colour liquid crystal pane. A light source 114 illuminates the screen 112 so as to project, by means of an optic 118, the image of the trace behind the viewing area 54. The support is of translucent material, at least in the area 54. In this way, the image of the trace appears in real time on the area 54, under the tip of the instrument.

The diagram of the circuits of the instrument 10 is illustrated by FIG. 3.

The electrical power required for the operation of the circuits of the instrument is provided by a rechargeable battery 32 via an off-switch circuit 34. The latter can comprise a manual off-switch housed on the body 22 and/or an automatic circuit for de-energizing should the instrument not be used beyond a predetermined duration.

Figure 7:
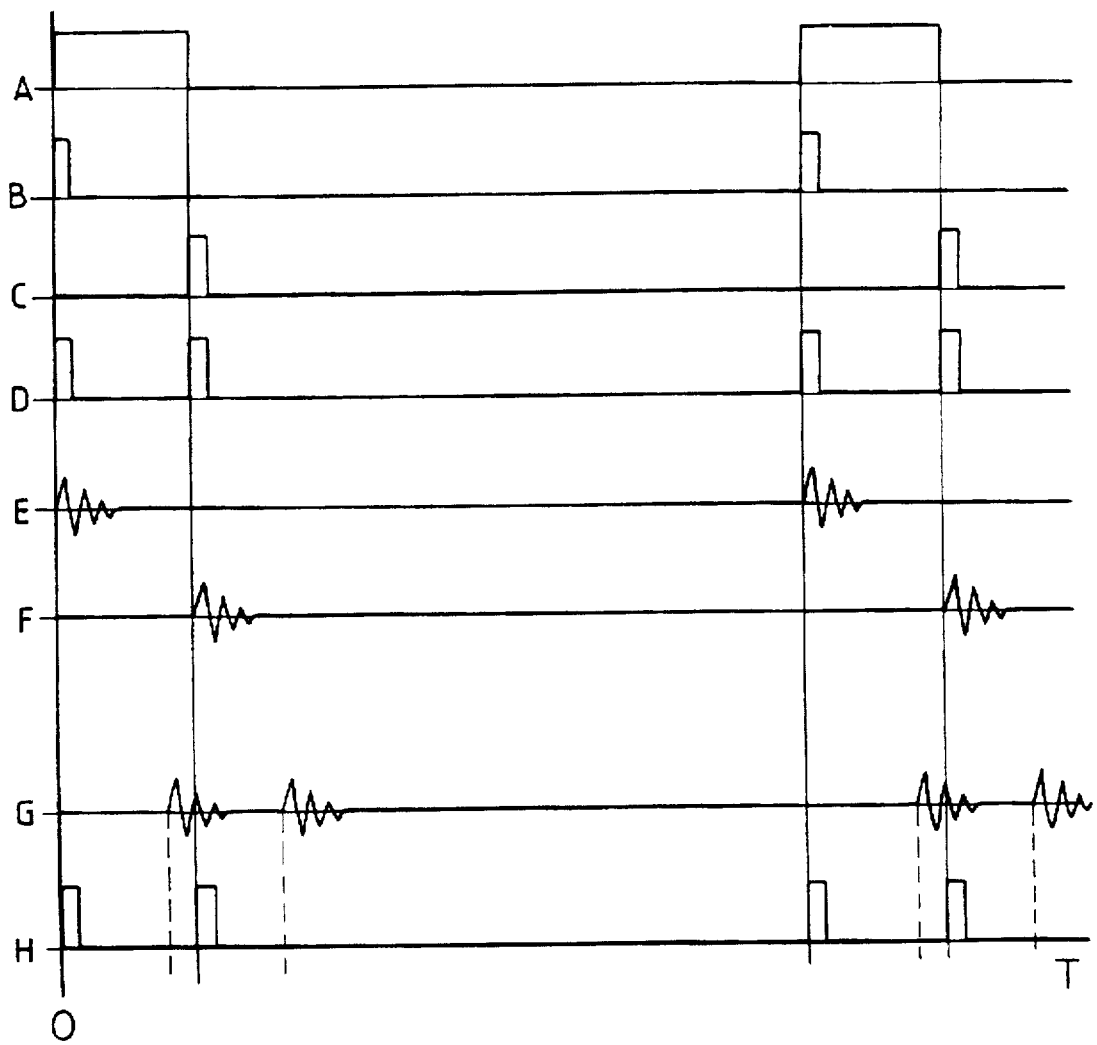
FIGS. 7 and 8 show waveforms relating to the emission and reception of the ultrasound pulses respectively for two levels of pressure exerted on the tip of the instrument.
Figure 8:
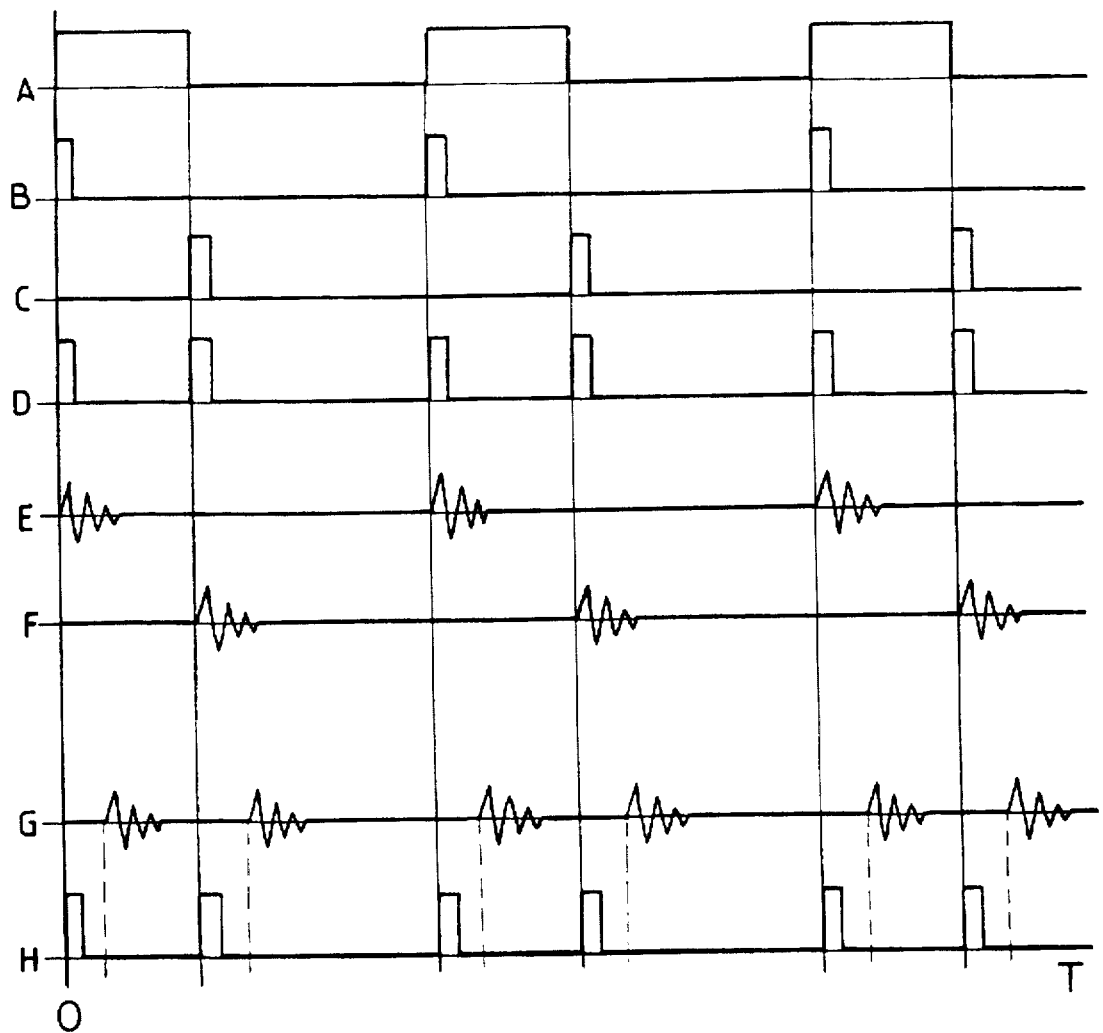

Rectangular pulses are provided by a time base 36 including an oscillator with voltage-controlled frequency. A displacement sensor 40 for example a Hall effect sensor, is connected to the tip 20 and provides a voltage representative of the pressure exerted on the tip 20, against the spring 28. The sensor 40 provides the control voltage for the oscillator of the time base 36 so that the pulses produced thereby have a frequency which varies as a function of the pressure exerted on the tip. The line A of FIG. 7 shows the pulses produced by the time base when the tip 20 is raised. When the tip 20 is pressed on the support 50, the frequency of the pulses grows as a function of the pressure exerted. The line A of FIG. 8 shows the pulses produced by the time base for a maximum pressure exerted on the tip 20, the retraction of the latter being limited by a stop 29.

The pulses of the time base 36 are applied to monostable circuits 42, 44, 46. The circuit 42 is triggered on the rising edge of the pulses of the time base and delivers voltage pulses (lines B of FIGS. 7 and 8) which, amplified by an amplifier 42a, are applied to the ultrasound emitter 12. The circuit 44 is triggered on the falling edge of the pulses of the time base and delivers voltage pulses (lines C of FIGS. 7 and 8) which, amplified by an amplifier 44a, are applied to the ultrasound emitter 14. The circuit 46 is triggered on the rising and falling edges of the pulses of the time base and delivers synchronization pulses (lines D of FIGS. 7 and 8) which, amplified by an amplifier 46a, are applied in parallel to the infrared emitters 16, 18.

The voltage pulses applied to the piezoelectric transducers constituting the emitters 12, 14 have an amplitude of around 150 to 200 V and a duration of a few tens of microseconds. In response to these pulses, emitters 12, 14 produce two ultrasound pulse trains (lines E and F of FIGS. 7 and 8), of like frequency, shifted in time. Each ultrasound pulse is formed by a damped sine wave whose frequency, determined by the transducer, is several tens of kHz, for example around 40 kHz, outside the audible region.

The duty factor of the pulses of the time base differs from 50% so as to allow discrimination between the ultrasound pulses of one of the two emitters 12, 14 and those of the other emitter. In the example illustrated, the pulses of the time base 36 have a constant width. The duty factor grows with the pressure exerted on the tip of the instrument, always remaining less than 50%. It is of course possible to retain a constant duty factor, only the frequency varying. Other forms of modulating the pulse trains via the pressure cue on the tip of the instrument can be envisaged, for example variation of the duty factor of the pulses of the time base, the frequency being constant.

As shown by FIG. 6, the ultrasound pulses gathered by the receivers 62a to 62e (such as those shown on the line G of FIGS. 7 and 8, for example for the receiver 62a) are amplified by amplifiers 64a to 64e with automatic gain control and are then applied to threshold detection circuits, 66a to 66e respectively. Each threshold detection circuit triggers the emission of a pulse by a corresponding monostable circuit, 68a to 68e respectively, when a threshold is exceeded by the signal received and amplified. The monostable circuits 68a to 68e constitute circuits for shaping the ultrasound pulses received.

Likewise, the infrared synchronization pulses received by the detector 70 (lines H of FIGS. 7 and 8) are amplified by an amplifier 70a with automatic gain control and are shaped by a monostable circuit 70b.

The rising edges of the synchronization pulses produced by the circuit 70b control the triggering in parallel of bistable latches 72a to 72e, whose resets are controlled respectively by the rising edges of the pulses produced by the circuit 68a to 68e. Counters 74a to 74e receiving clock pulses originating from a processor 80 are started and stopped on the rising and falling edges of the pulses produced by the bistable latches 72a to 72e. Under control of the processor 80, the values counted by the counters 74a to 74e are read and the counters are reset to zero.

The clock pulses of the processor 80 are also counted by a counter 76a. The counter 76a is triggered and stopped by the successive zero crossings of a counter modulo 2 76b receiving the pulses from the circuit 70b. The value counted by the counter 76a, which is representative of the frequency of the time base 36, and therefore of the pressure exerted on the tip of the instrument, is read under the control of the processor 80 and the counter is reset to zero.

The values counted by the counters 74a to 74e represent the times of propagation of the ultrasound pulses between the emitters 12, 14 and the receivers 62a to 62e. Knowing the speed of propagation of the ultrasounds, it is possible to deduce therefrom the length of the journey undertaken by the pulses. In order to take account of the influence of factors such as the temperature and humidity on the speed of propagation of the ultrasounds, this speed is measured periodically. For this purpose, under the control of the processor 80, a voltage pulse is produced by a monostable circuit 78, amplified by an amplifier 78a and applied to an ultrasound wave emitter 82 similar to the emitters 12 and 14. The pulse is received by a receiver 84 and is processed in a way similar to the pulses received by the receivers 62a to 62e. Thus, the pulse received by the receiver 84 is shaped by means of an amplifier 84a with automatic gain control, a threshold detector 84b and a monostable circuit 84c. A bistable latch 86 is triggered by the rising edge of the pulse of the monostable circuit 78 and reset by the rising edge of the pulse of the monostable circuit 84c. A counter 88 receiving the clock pulses originating from the processor 80 is started and stopped on the rising and falling edges of the pulse produced by the bistable latch 86. Under the control of the processor 80, the value counted by the counter 88 is read and the counter is reset to zero.

The emitter 82 and the receiver 84 occupy predetermined fixed positions such that the distance separating them is known. The value counted by the counter 88 therefore allows calculation of the true value of the speed of propagation of the ultrasound waves. Of course, the locations of the emitter 82 and of the receiver 84 are chosen so as not to influence the operation of the receivers 62a to 62e.

Figure 9:
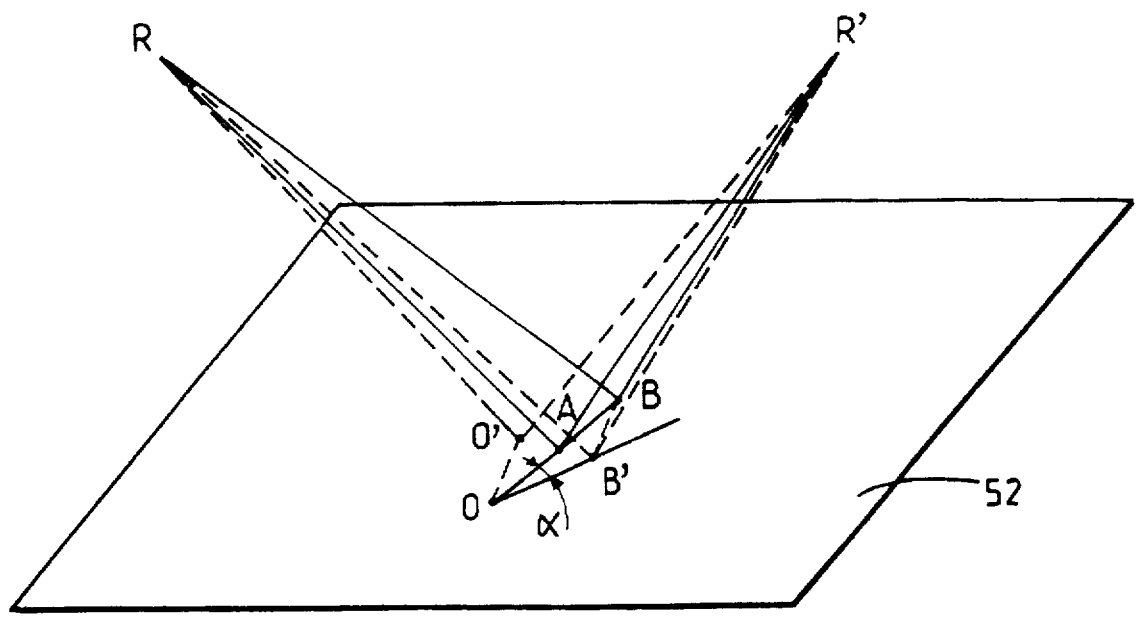
FIGS. 9 and 10 are sketches illustrating the way of calculating the position of the tip of the instrument and its orientation.

FIG. 9 shows schematically the location of the centres A and B of the ultrasound emitters 12, 14 and of the end O of the tip 20 for a given position of the instrument 10 pressing on the support 50. In FIG. 9, the points R and R' represent the centres of two ultrasound receivers, for example receivers 62a and 62d. The circuit described with reference to FIG. 6 makes it possible to determine the distances RA and RB, which are given by two values counted successively by the counter 74a associated with the receiver 62a, as well as the distances R'A and R'B which are given by two values counted successively by the counter 74b associated with the receiver 62b.

It can be assumed that the distance RB is substantially equal to the distance RB' and that the distance R'B is substantially equal to the distance R'B', B' being the projection of the point B on the plane passing through the points R, R' and A, substantially parallel to the plane of the support 50. Likewise, O' being the projection of the point O on this same plane, it can be assumed that the distances RO and RO' are substantially equal, and likewise for the distances R'O and R'O'.

Knowing the distances RA and RB and the distances R'A and R'B then makes it possible, through simple calculation, to determine the coordinates $(x_A, y_A)$ and $(x_B, y_B)$ of the points in a two-dimensional frame tied to the support 50, for example in an orthonormal frame $(I_x, I_y)$ whose axes are parallel to the sides of the rectangular area 52 and whose centre coincides with a vertex of this area (FIG. 1).

The emitters 12 and 14 are mounted on the body of the instrument 10 so that the points O, A and B are substantially aligned. The ratio r between the distance OB (or OB') and the distance AB (or AB') being known, the coordinates $(x_O, y_O)$ of the point O are readily deduced from those of the points A and B.

Determination of the coordinates of the points A and B is also used to provide information relating to the orientation of the instrument 10 with respect to the support, namely the inclination of the instrument with respect to the support and the angular position of the instrument about an axis having a predetermined direction with respect to the support.

Figure 10:
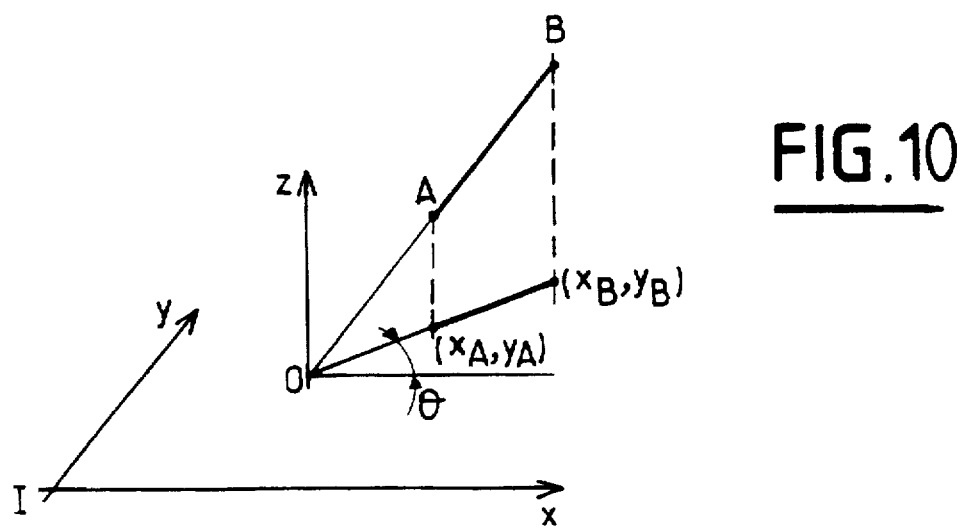

Represented in FIG. 10, in outline, is the projection of the vector defined by the points A and B on a plane parallel to that of the support. The amplitude of this projection depends on the inclination of the instrument with respect to the support, this amplitude in fact depending on the cosine of the angle SYMBOL 97 \f "Symbol" made by the vector AB with respect to the plane of the support (FIG. 9). Measurement of the amplitude of the projection of the vector AB therefore allows determination of the angle SYMBOL 97 \f "Symbol" and thereby, of the sought-after inclination since the angle SYMBOL 98 \f "Symbol" made by the vector AB with respect to the longitudinal axis 24 of the instrument is known.

Furthermore, the angular position of the instrument about an axis is determined by the direction of the projection of the vector AB. Taking as arbitrary reference the axis Ix, the angular position SYMBOL 113 \f "Symbol" of the instrument is therefore determined by the slope p of the straight line containing the projection AB (FIG. 10). The reference axis is not parallel to the vector AB; it is for example perpendicular to the support, such as the axis Oz (FIG. 10), the instrument 10 not normally being held in a position such that the vector AB is perpendicular to the support.

Conversion of the inclination cue and the angular position cue for the instrument into a stroke width cue depends on the implement and on the geometry of the tip of the implement. For certain implements, for example a pencil, the stroke width will be given uniquely by the pressure exerted on the tip.

The values of stroke thickness for various inclinations and angular positions and for various pressures exerted on the tip are determined for various types of writing implement and are recorded in tables.

When the stroke width is given by the inclination and the angular position of the implement, for example when this is a felt-tip, the tables, for the various implements being able to be simulated, are in the form of arrays with two inputs, one being the inclination and the other the angular position. The angular position values which appear in the tables are given with respect to a reference which corresponds approximately to the way in which the instrument 10 should normally be held by the user in order for the emitters 12, 14 to be directed towards the receivers in every position of the instrument on the viewing area 54.

When the stroke width is given by the pressure exerted on the tip, the tables give the correspondence between the pressure and the stroke width directly.

When the stroke width is given by the orientation (inclination and/or angular position) and the pressure exerted on the tip, the tables have two inputs, one being the inclination or the angular position and the other the pressure, or else three inputs: inclination, angular position and pressure.

The colour of the trace is determined through a stroke colour selection made by the user. It is possible to choose the same colour for a complete trace, or to choose different colours for various portions of the same trace.

A trace colour cue is associated with the position cue for the tip of the instrument and with the stroke width cue for this position.

The trace colour cue depends in certain cases on the pressure exerted on the tip of the instrument. In fact, at least with some felt-tips, the higher the pressure exerted, the stronger the density of the colour. Also, for these writing implements, the correspondence between the stroke colour selected and the colour actually simulated, that is to say the trace colour cue, is given by tables as a function of the pressure exerted.

The trace colour cue depends also on any superposition of several strokes. Thus, when several stroke colour cues are associated with the same point of the trace, this point is reproduced with a colour which is the resultant of these stroke colour cues. If the stroke colours are identical, the resultant consists of this same colour with a higher level of saturation. If the stroke colours are different, the resultant consists of a mixture of the stroke colours. The resultant is read from a table, from among the pallet of possible colours, so as to display the corresponding pixel with the resultant colour. The trace colour cue, that is to say the resultant colour, can be compiled at the time the trace cues (position, stroke width, colour) are stored, or at the time the trace is reproduced. In the latter case, several stroke colour cues may be associated with the same position cue.

The processor 80 controls the determination, for each sampled point of the trace (that is to say for each pulse of the time base 36), of the coordinates $(x_A,y_A)$, $(x_B,y_B)$ together with validation of this determination through redundant measurements, and the storage of these coordinates in a random access memory 96, whilst associating therewith a cue indicating the level of pressure exerted on the tip of the instrument. The memory 96 is accessible via a bus 98 to which are also connected, apart from the processor 80, the counters 74a to 74e, 76a and 88.

The cue representing the pressure level, in this instance the contents of the counter 76a, makes it possible to detect whether a pressure is exerted on the tip 10, that is to say whether tracing is or is not in progress.

The operations performed under the control of the processor 80 to determine the coordinates $(x_A,y_A)$, $(x_B,y_B)$ and the pressure exerted on the tip 20 are as follows (FIG. 11):

In response to the reception of an infrared pulse (phase 120), the contents of the counters 74a to 74e and 76a are read and the counters are reset to zero (phase 122).

On the basis of the contents of the counters 74a to 74e, the coordinates $(x_A,y_A)$, $(x_B,y_B)$ are calculated for each pair of receivers, this giving 10 results. The calculation is performed in a manner which is well known through the application of conventional triangulation formulae (phase 124).

For each coordinate, the calculated values are examined in succession, and the first value for which at least one, and preferably two confirmations are found inside a predetermined margin of error is selected (phase 126). Any other statistical treatment giving the most probable value, based on the calculated population, could be used.

The values $(x_A, y_A)$, $(x_B,y_B)$ thus selected are recorded in the memory 96, in association with the value read from the counter 76a which represents the frequency of the ultrasound pulse trains, that is to say the frequency of the time base 36, and hence the pressure B exerted on the tip 20 (phase 128).

Periodically, the processor 80 moreover commands the emission of a pulse by the emitter 82 (phase 130). In response to the receiving of a pulse by the receiver 84 (phase 132), the contents of the counter 88 are read and the counter is reset to zero (phase 134). The value read from the counter 88 is stored (phase 136) so as to provide a reference of the speed of the ultrasounds in ambient air.

The information stored in the memory 96 is accessible to a monitoring and display system organized around a processor 102. The tables giving the relation between, on the one hand, the width of stroke and, on the other hand, the inclinations and angular positions of a writing implement and/or the pressure exerted on its tip, are stored in read only memory 104 for various types of writing implement. The same is true for the tables giving the relations between pressure exerted on the tip and colour intensity level, for certain types of writing implement, and for the tables giving the relations between resultant colour of trace and stroke colours selected in the event of the superposition of strokes.

A bus 108 serves the processor 102, the read only memory 104, a random access memory 106, the dual-access memory 96 and the display device 110.

The processor 102 controls the execution of the calculations required to determine the coordinates of the tip of the instrument and to evaluate the instrument orientation information. For each sampling of the trace, the processor commands the storage in the memory 106 of the determined cues on position, width of stroke and colour of trace and the displaying of the corresponding trace on the display device 110.

These operations performed by the processor 102 are indicated in the flowchart of FIG. 12.

Periodically, access to the memory 96 is commanded in order to read the current information representative of the coordinates $(x_A, y_A)$, $(x_B,y_B)$ and of the pressure P (phase 140). Read access to the memory 96 by the processor 102 is permitted, under the control of the processor 80, outside of the phases for writing to this memory.

The coordinates $(x_O,y_O)$ of the tip 20 are calculated (phase 142) from the values read $(x_A,y_A, x_B,y_B)$.

Likewise, the amplitude L of the projection of the vector AB is calculated, as is the angle SYMBOL 113 \f "Symbol" corresponding to the slope of this projection (see FIG. 10) (phase 144), from the values read $(x_A,y_A)$, $(x_B,y_B)$.

Depending on the type of implement selected by the user, a value of stroke width 1T is read from the tables of the memory 106 based on the data P and/or L and/or SYMBOL 113 \f "Symbol" (phase 146).

A colour cue CT is determined which, depending on the type of implement selected by the user, is equal to the stroke colour selected or is read from a table of the memory 106 based on the data P (phase 148).

The calculated coordinate cues $(x_O,y_O)$ are stored in association with the corresponding stroke width cue 1T and colour cue CT (phase 150).

Finally, the device 110 is commanded to display on the screen 112 an image representing the coordinates $(x_O,y_O)$, the stroke width 1T and the trace colour (phase 152).

When several colour cues are associated with the same position cue, the trace colour for this position is read from the colour mixture table of the memory 106.

As shown in FIG. 13 which is a schematic representation of the displaying of a trace made with the device according to the invention, the trace 19 of variable width (thick strokes and hair-strokes) is made by successively displaying strokes, labelled 21, of width 1T with origin $(x_O,y_O)$. Given the high frequency of determining the coordinates of the vectors $(x_A,y_A)$, $(x_B,y_B)$, these strokes are very close together. Moreover, the small spaces 23 which may possibly lie between the projections are filled in automatically during display with the colour selected by the operator or a resultant colour. Quite clearly, the various strokes 21 do not appear on the display, the whole ultimately forming a continuous trace whose width varies as a function of the orientation, inclination and pressure given to the instrument by the user.

The processor 102 moreover manages the dialog with the user for the switching on of the device, the choosing of a particular type of writing implement to be simulated, the choosing of an implement gauge, the choosing of a colour, the making of a trace, the erasing, modifying or saving of drawings, the copying or pasting of drawings, etc.

Advantageously, the interface between the user and the processor 102 is constituted solely by the support 50 and the instrument 10.

After switching on the system, the detection of the positioning of the tip of the instrument 10 outside the viewing area 54 of the support 50, but inside the working area 52 prompts the displaying of a menu on the viewing area 54, for example in the form of icons. Among the options selectable from the menu figure in particular the choices indicated above.

The option chosen from the menu is determined by the position of the tip of the instrument 10 on the border of the viewing area 54. Acceptance of the selection is for example performed by pressing on the tip and detecting the pressure thus exerted.

By way of example, the positioning of the tip of the instrument 10 on the insides of the working area 52, to the right or the left of the viewing area 54 (as shown in FIG. 1), prompts the displaying within this area 54 of a menu offering the graphics options. Selection and acceptance of an option is performed by determining the position of the instrument tip in regard to the latter, on the outside of the area 54, and by detecting the pressing of the tip on the support. The positioning of the tip of the instrument 10 on the inside of the working area 52, beneath the lower edge of the viewing area 54, prompts the displaying within this area of a file management menu, selection and acceptance being performed as described above. Finally, the positioning of the tip of the instrument on the inside of the working area 52, above the upper edge of the viewing area 54, prompts the execution of a calibration phase by emitting ultrasound pulses from the fixed emitter 82 and measures the time of propagation up to the fixed receiver 84.

Program selection is thus performed by means of the instrument 10 and the support 50 in the same way as with a light pen and a monitor screen.

The positioning of the tip of the instrument within the viewing area 54 and the detecting of the position of the tip in this area prompt the erasing of the menus and the initialzing of the program for capturing and processing the trace.

We claim:

1. A method of capturing and processing graphical data representative of a trace made on a surface of a neutral support by means of a tip of an instrument, comprising the steps of:

emitting a plurality of ultrasound pulses by means of at least two ultrasound wave emitters carried by the instrument and spaced apart in a longitudinal direction of the instrument, and substantially aligned with the tip of the instrument, receiving the ultrasound pulses by several ultrasound wave receivers occupying positions determined with respect to the support, such that ultrasound pulses emitted from any point on the surface are received by more than two receivers, measuring a plurality of propagation times of the ultrasound pulses between each of the emitters and receivers, evaluating, from the measured propagation times, a plurality of coordinates of at least one vector defined by the positions of the two emitters carried by the instrument, determining, from the evaluation of the coordinates of the vector, a position of the tip of the instrument on the support, and at least one of two instrument orientation cues consisting of an inclination of the longitudinal direction of the instrument with respect to the support and an angular position of the instrument about an axis making a predetermined angle with respect to the support, detecting a pressure exerted on the support by the tip of the instrument, transmitting a cue representative of the detected pressure and determining, as a function of at least one of the orientation and pressure cues, a stroke width cue, so as to associate a cue representing the position of the tip of the instrument with a cue representing the stroke width for the position of the tip of the instrument.

2. The method recited in claim 1, wherein, for evaluating the coordinates of the vector defined by the positions of the two emitters, an erroneous or anomalous measurement can be detected and discarded by using a redundant number of propagation time measurements.

3. The method recited in claim 1, wherein the orientation cues of the instrument are determined from the measurement of an amplitude and a direction of the projection onto the support of the vector defined by the positions of the two emitters.

4. The method recited in claim 1, wherein the emission of the ultrasound pulses and the commencement of the measurement of the propagation time of the ultrasound pulses up to the receivers are synchronized by transmitting infrared pulses from the instrument, and the cue representative of the pressure exerted on the tip of the instrument is transmitted by modulation of the infrared pulses.

5. The method recited in claim 1 further comprising the step of selecting a type of writing implement simulated by the instrument and determining a stroke width on the basis of a plurality of prerecorded cues giving, for various writing implements, a relation between the width of stroke traced with a tip of the writing implement on a surface and at least one cue from among an inclination of a longitudinal direction of the writing implement with respect to the surface, an angular position of the writing implement about an axis making a predetermined angle with respect to the surface, and a pressure exerted on the tip of the writing implement.

6. The method recited in claim 1, wherein the ultrasound pulses are emitted at a frequency at least equal to 50 Hz allowing acquisition of the coordinates of at least 50 vectors per second.

7. The method recited in claim 1, further comprising the steps of periodically emitting and receiving an ultrasound pulse by means of an emitter and a receiver, each occupying a predetermined fixed relative position so as to provide a reference value of a speed of propagation of the ultrasound waves in an ambient environment.

8. The method recited in claim 1, further comprising the step of selecting a stroke color and determining a colour density cue on the basis of the cue representing the pressure exerted on the tip of the instrument, so as additionally to associate the cue representing the position of tip of the instrument with a cue representing the color of the trace for the position of the tip of the instrument.

9. The method recited in claim 1, further comprising the step of selecting a stroke color, different colours being selectable for a plurality of portions of the trace, and associating the cue representing the position of the tip of the instrument with a cue representing the color of the trace for the position of the tip of the instrument, the trace color cue being either the stroke color selected for a portion of the trace on which the position of the tip of the instrument lies, a color saturation selected when the position of the tip of the instrument is at an intersection of a plurality of trace portions for which the same color has been selected, or a mixture of colors selected when the position of the tip of the instrument is at an intersection of a plurality of trace portions for which different colors have been selected.

10. The method recited in claim 1, wherein the position and stroke width cues are used to control a displaying of the trace made with the tip of the instrument and a back-projection onto the support of the displayed trace, so that the back-projection appears in real time under the tip of the instrument.

11. The method recited in claim 1, further comprising the step of displaying at least one menu in a zone of the surface of the support and selecting an option from the displayed menu, in response to a detection of the position of the tip of the instrument at a location corresponding to the selected option.

12. The method recited in claim 11, wherein a plurality of menus are displayed in a viewing zone of the surface of the support and wherein a desired menu is selected in response to a detecting of the tip of the instrument in a predetermined region of a working area of the support, outside and adjacent to the viewing zone.

13. The method recited in claim 11, wherein the displayed menu makes it possible to select a particular type of writing implement whose use is simulated, the gauge of this implement, and a stroke color for this implement.

14. The method recited in claim 11, wherein the displayed menu makes it possible to select a drawing management function chosen in particular from a group of functions, the group including an erase function, a modify function, a save function, a copy function, and a paste function.

15. A device for capturing and processing graphical data representative of a trace made on a surface of a support by means of a tip of an instrument, comprising:

at least two ultrasound wave emitters carried by the instrument and spaced apart in a longitudinal direction of the instrument, a voltage pulse generating circuit connected to the emitters in order to effect the emission of ultrasound pulse trains, a plurality of ultrasound wave receivers occupying positions determined with respect to the support in such a way that ultrasound pulses emitted from any point on the surface are received by more than two receivers, means for detecting a pressure exerted on the tip of the instrument, means for transmitting a pressure cue representative of the detected pressure, and a processing circuit connected to the ultrasound wave receivers and receiving the pressure cue, the processing circuit comprising:

means for measuring a plurality of propagation timers of the ultrasound pulses between each of the emitters and receivers, means for evaluating, from the measured propagation times, a plurality of coordinates of at least one vector defined by the positions of the two emitters carried by the instrument means for determining, from the evaluation of the coordinates of the vector, a position of the tip of the instrument on the support, and at least one of two instrument orientation cues consisting of an inclination of the longitudinal direction of the instrument with respect to the support and an angular position of the instrument about an axis making a predetermined angle with respect to the support, and means for determining, as a function of at least one of the orientation and pressure cues, a stroke width cue, so as to associate a cue representing the position of the tip of the instrument with a cue representing the stroke width for the position of the tip of the instrument.

16. The device recited in claim 15, wherein the voltage pulse generating circuit has a frequency which varies as a function of the detected pressure.

17. The device recited in claim 15, further comprising means for storing cues representing, for various types of writing implements, a predetermined relation between the stroke width and at least one of the said orientation and pressure cues.

18. The device recited in claim 15, further comprising means for selecting a stroke color and wherein the processing circuit further comprises means for associating the cue representing the position of the tip of the instrument with a trace color cue for the position of the tip of the instrument.

19. The device recited in claim 18, wherein the processing circuit further comprises means for associating the position cue for the tip of the instrument with a trace color cue, the trace color cue being:

either the stroke color selected for a portion of the trace on which the position of the tip of the instrument lies, a color saturation selected when the position of the tip of the instrument is at an intersection of a plurality of trace portions for which the same color has been selected, or a mixture of colors selected when the position of the tip of the instrument is at an intersection of a plurality of trace portions for which different colors have been selected.

20. The device recited in claim 18, further comprising means for storing, for at least certain types of simulated writing implements, a relation between the selected color of stroke, the trace color corresponding to the selected color of stroke, and a color density, the colour density depending on the pressure exerted on the tip of the implement.

21. The device recited in claim 18, further comprising means for displaying in real time an image of the trace reproducing the position, stroke width and trace color cues.

22. The device recited in claim 21, wherein the display means include a device for back-projecting onto the support made from a translucent material so that an image of the trace appears in real time under the tip of the instrument.

23. The device recited in claim 15, wherein the receivers are arranged on a same line along one side of a working area.

24. The device recited in claim 15, wherein the ultrasound wave emitters and receivers are comprised of a plurality of directional transducers.

25. The device recited in claim 15, further comprising:

at least one infrared wave emitter carried by the instrument, means for applying pulses to the infrared wave emitter in synchronism with the application of pulses to the ultrasound wave emitters, and at least one infrared wave receiver carried by the support.

26. The device recited in claim 25, further comprising two infrared wave emitters linked in parallel and fixed at two opposite locations of the instrument.

27. The device recited in claim 15, further comprising at least one additional ultrasound wave emitter and receiver, each occupying a predetermined fixed relative position, and wherein the processing circuit further comprises means for measuring a time of propagation of ultrasound waves between the additional emitter and receiver so as to compile a cue representative of a speed of propagation of the ultrasound waves.

* * * * *